Patented Aug. 26, 1952

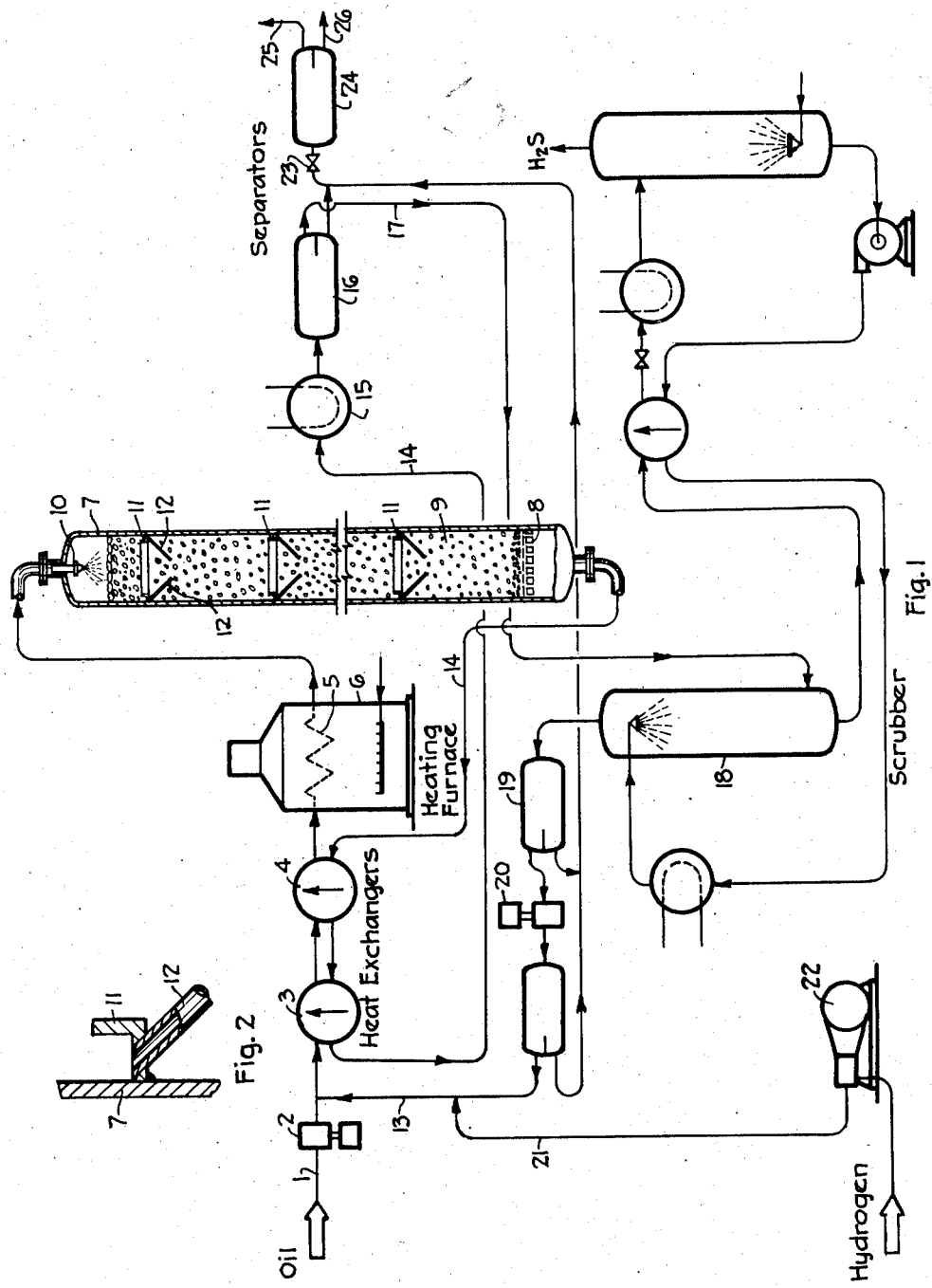

2,608,521

UNITED STATES PATENT OFFICE 2,608,521

PROCESS FOR REFINING CARBONACEOUS MATERIAL

Han Hoog, Amsterdam, Netherlands, assignor to Shell Development Company, San Francisco, Calif., a corporation of Delaware Application December 31, 1948, Serial No. 68,454
In the Netherlands January 6, 1948

6 Claims. (Cl. 196—28)

This invention relates to a new and improved method for desulfurizing various hydrocarbon oils by catalytic hydrogenation. While all types of sulfur compounds are hydrogenated in the process of the invention, the invention relates more particularly to a process which destroys thiophenic compounds and similar so-called refractory sulfur compounds. If the oil treated contains nitrogen compounds, oxygen compounds, and/or diolefins or other gum-forming constituents, these are likewise largely, if not substantially completely removed. The Conradson carbon content of the oil is also materially reduced in such cases where it is initially high.

Sulfur-bearing hydrocarbon oils generally contain the sulfur in the form of more than one type of sulfur compound. Some of these compounds, such as alkyl mercaptans and alkyl disulfides, are relatively easily removed by a number of methods, and these are generally called non-refractory sulfur compounds. Other sulfur compounds, such, for example, as the thiophenic sulfur compounds, are much more difficult to remove and these are called refractory compounds. The non-refractory sulfur compounds may be removed, for example, by treating the oil with or without small amounts of hydrogen with such weakly catalytic materials as certain clays, bauxite, mill scale, pyrites, etc. The refractory sulfur compounds on the other hand require much more drastic treatment for their removal. Some oil-treating process, such as destructive hydrogenation, hydroforming, and catalytic cracking, effect a partial removal of such refractory sulfur compounds, but in such processes the oil is materially changed in basic characteristics by dehydrogenation, cracking and/or other reactions and such desulfurization as is effected is incomplete and more or less incidental. By far the most efficient method for the removal of so-called refractory sulfur is through catalytic hydrogenation. This process, although of very limited application, is well known and is commonly referred to as hydrodesulfurization.

In hydrodesulfurization the oil to be desulfurized is treated with a large amount of hydrogen in the presence of an active sulfur-resistant hydrogenation catalyst under suitable conditions of temperature and pressure. The oil is usually in the vapor phase, but in some cases where the amount of hydrogen required to completely vaporize the oil would be exorbitant (for example, above 20,000 cubic feet per barrel of oil) the oil can be treated in the liquid phase. In the presence of hydrogen and under the conditions of temperature required the oil is still largely in the vapor phase, but if a liquid phase is present the operation is considered to be a liquid-phase operation. This is due to the fact that the efficiency of the process is materially changed as soon as a liquid phase is present. When a liquid-phase is present, the reaction rate is materially lower and also the catalyst suffers a greater rate of decline in activity. For these reasons the vapor phase process is by far the more economical when it can be applied and is preferred. As far as can be determined the vapor phase process is the only one that has been applied commercially in the United States to date.

The desulfurization of hydrocarbon oils by hydrodesulfurization has been repeatedly investigated always with the same results. These investigations have all shown that when hydrodesulfurizing oils by the conventional methods, it is desirable, if not essential, for practical operation to use a large amount of hydrogen. Thus, with amounts of hydrogen in the order of 2,000–3,000 cubic feet per barrel of oil, a fairly good desulfurization is obtained for a short time, but the catalyst declines in activity and requires regeneration. As the amount of hydrogen is increased to 3,000–5,000 cubic feet per barrel of oil the efficiency of the desulfurization is increased and the life of the catalyst is increased. As the amount of hydrogen is further increased the efficiency of desulfurization falls off slightly due to decreased time of contact, but the catalyst life is further increased. In the vapor phase process, it is therefore preferred to employ in the order of 5,000–10,000 cubic feet per barrel of oil since with these amounts an excellent desulfurization may be obtained while operating substantially continuously, i. e. over several hundred hours without regeneration of the catalyst. The various investigations are consistent in showing that by the use of sufficient amounts of hydrogen and operating preferably in the absence of the liquid phase, it is possible to obtain 80% or greater desulfurization or even quite refractory hydrocarbon oils without substantial alteration of the basic properties of the oil.

In the past a few improvements in the hydrodesulfurization process have been made through the development of more active and more selective catalysts. The latest and, it is believed, the most efficient known version of this process to date is described in considerable detail in the "Transactions of the American Institute of Chemical Engineers," vol. 43, No. 1, page 1, January, 1947, to which reference is made. In this process excellent desulfurization may be obtained with substantially continuous operation when operating in the absence of a liquid phase. When operating with a liquid phase present, i. e. when the oil is only approximately 75–90% vaporized, the maximum desulfurization efficiency is obtained when using about 3,500 cubic feet of hydrogen per barrel of oil, but the recommended amount of hydrogen is 4,240 cubic feet per barrel of oil, and even with this amount of regeneration of the catalyst after every 24 hours of processing is recommended.

In spite of the fact that a substantially complete desulfurization of hydrocarbon oils may be obtained in a substantially continuous manner by the known vapor phase hydrodesulfurization process, and less economically in the corresponding liquid phase process, the known hydrodesulfurization process has come into only very limited application. This is due to the fact that the known process is quite costly. Thus, even in the isolated instances where by-product hydrogen may be charged at fuel gas value, the vapor phase hydrodesulfurization of a typical oil costs in the order of 30–35¢ per barrel. This is greater than the price differential prevailing in the past between low and high sulfur petroleum oils of equivalent value in other respects. In spite of the great demand for an efficient desulfurization process, it has, therefore, been uneconomical to apply the known hydrodesulfurization process, even in its most favorable embodiment, except in a few isolated instances where by-product hydrogen has been available and for the treatment of specialty products.

The high costs of the known hydrodesulfurization process is seen, upon analysis, to reside firstly in the large amount of costly high-pressure apparatus required, secondly in the large operating costs (heating, cooling, compressing, etc.).

It has now been found that the desulfurization of hydrocarbon oils by hydrodesulfurization may be carried out equally efficiently and considerably more economically by operating the process in the particular manner and under the particular conditions hereinafter described. To aid in the description, reference is had to the attached drawing wherein one form of suitable apparatus for carrying out the invention is illustrated diagrammatically.

Referring to the drawing, Figure 1, the oil to be desulfurized is introduced into the plant via line 1 and pump 2. The process is applicable for the desulfurization of sulfur-bearing hydrocarbon oils regardless of their origin or past history. Thus, the feed stock introduced via line 1 may be of any sulfur-bearing hydrocarbon oil which may be treated under the described conditions while maintaining it substantially in the liquid phase, i. e. with less than 50% vaporization. Thus the process is applicable for the desulfurization of many gasolines and most naphthas. The process is best adapted, however, to the desulfurization of hydrocarbon oils which are heavier than gasoline and it is particularly advantageous, as compared to the hitherto known process, when desulfurizing heavy oils which are difficult to vaporize completely. After being preheated somewhat in the conventional manner by heat exchange in heat exchangers 3 and 4 the oil is further preheated in coil 5 of the fired heating furnace 6. The preheated oil in the liquid phase is then introduced into the catalytic reactor 7 at the top.

Reactor 7 is a vertically disposed cylindrical vessel of suitable dimensions to handle the required volume of reactants and capable of withstanding the working conditions of temperature and pressure. For reasons which will be pointed out in more detail below it is essential that the reactor have a ratio of length to diameter of at least 5 to 1 and preferably above 6 to 1. In a typical case reactor 7 is 6 feet in diameter and 54 feet in length and is constructed of 2½ inch A-212 steel with a stainless steel lining.

The reactor 7 is provided with a suitable perforated plate 8 near the bottom to support the stationary bed of catalyst 9. In order to decrease the weight of catalyst on this support it may be desirable to provide one or more additional supports higher up in the reactor. The reactor 7 is also provided with a suitable means at the top for distributing the incoming hydrocarbon oil over the upper surface of the bed of catalyst. In the reactor illustrated a spray cone 10 is provided for this purpose. Other suitable means may however be used.

The catalyst bed which substantially fills the reactor has a ratio of length to diameter of at least 5 to 1. That part of the liquid oil which flows down through the reactor near the wall is less efficiently contacted. In order to correct this deficiency the reactor is provided with a suitable means for directing the liquid flowing near the walls inwardly toward the center of the bed. In the reactor illustrated short troughs 11 are attached to the reactor wall at spaced intervals. A number of open-ended pipes 12 extend from the troughs downwardly and inwardly towards the center of the catalyst bed. The arrangement of the troughs 11 and pipes 12 is shown in more detail in Figure 2. In operation, the liquid oil descending near the wall of the reactor collects in the troughs 11 and then flows through pipes 12 to a point near the center of the bed.

Any of the known sulfactive hydrogenation catalysts, such as conventionally used heretofore for hydrodesulfurization, destructive hydrogenation, hydrofining and related processes may be used in the present process. The preferred catalysts have as their main active ingredient one or more hydrogenating oxides or sulfides of the transition metals, such in particular as molybdenum, nickel and tungsten. These various materials may be used in various combinations with or without such stabilizers and promoters as the oxides and carbonates of K, Ag, Be, Mg, Ca, Sr, Ba, Ce, Bi, Cr, Th, Si, Al and Zr. These various catalysts may be applied per se or in combination with various conventional supporting materials which in certain cases may impart important characteristics to the catalyst. Examples of a few applicable supporting materials are activated carbon, fuller's earth, kieselguhr, silica gel, aluminum oxide, pumice, bauxite and activated magnesia. (The term "activated" is here used to indicate that the material has a microporous structure affording a large inner surface.)

While any of the mentioned classes of conventional sulfactive hydrogenation catalysts may be used, some catalysts are better than others. It is found that a molybdenum oxide catalyst promoted by a minor amount of cobalt oxide and supported upon an activated alumina is a particularly good catalyst for this process. This preferred catalyst is somewhat similar to that described in U. S. Patent No. 2,393,288, but differs therefrom in that the oxides of molybdenum and cobalt are incorporated by impregnation in a previously activated alumina and the mole ratio of molybdenum to cobalt is about 5 to 1. The activated alumina used may advantageously be an activated bauxite. Activated Surinam bauxite is particularly suitable. This is the subject matter of copending application Serial No. 82,285 filed March 18, 1949.

The catalyst may be in the form of broken fragments such as obtained by crushing, or it may be in the form of formed pieces such as pellets or cast pieces of any suitable form or shape. The catalyst pieces may have an average diameter of a few millimeters, e. g. 3 mm., up to several centimeters.

As previously pointed out, the reaction rate when a liquid phase is present is lower than when operating in the vapor phase. In the past when operating with a liquid phase present it has been necessary to restrict the throughput rate to a liquid hourly space velocity (L. H. S. V.) of about 1 or below. (The L. H. S. V. is defined as the volumes of oil, measured as a liquid, which are passed through the volume of the catalyst bed in an hour.) In the process of the invention it is possible to obtain excellent desulfurization with oil throughput rates in the order of 1 to 5 kg. of oil per liter of catalyst bed per hour. This corresponds to a liquid hourly space velocity between about 1.2 and about 6.3. Lower space velocities may be required in exceptional cases and higher space velocities may sometimes be permissible.

In the process of the present invention the throughput of oil per square foot of horizontal cross section of the catalyst bed is also important. One advantage of the present process is that high throughput rates are not only possible but are desirable to obtain the maximum desulfurization efficiency. Thus, a throughput of at least 1 gallon per minute per square foot of cross section is required and a throughput of at least 3 gallons per minute per square foot cross section is preferred. Typical values are, for instance, 5, 9 and 9 gallons of oil per minute per square foot of cross section. Throughputs up to about 20 gallons per minute per square foot may be used. For a plant of any given desired capacity the reactor is constructed to afford throughput rates in this range. This requires that the catalyst bed has a high ratio of length to diameter. As pointed out, this ratio is at least 5:1 and preferably at least 6:1.

A gas rich in hydrogen is introduced simultaneously with the oil into the top of the reactor. In practice this gas is recycled gas to which a small amount of make-up hydrogen is added. Thus, gas from line 13 is mixed with the incoming oil and is preheated in the heat exchangers 3 and 4 and furnace 6. The hydrogen gas passes downwardly through the catalyst bed in contact with the oil, and the mixture of gas and liquid oil are withdrawn together from the bottom of the reactor via line 14. After partial cooling in heat exchangers 3 and 4 the mixture is further cooled in cooler 15 and then passed to the high pressure separator 16. The gas is removed from the high pressure separator 16 via line 17 and passed to a conventional hydrogen sulfide scrubber 18. After passing through a trap 19 and being compressed in booster compressor 20, the gas, now substantially free of hydrogen sulfide, is recycled via line 13. The make-up hydrogen is introduced via line 21 by compressor 22. The amount of makeup hydrogen added equals the amount of hydrogen used up in the hydrogenation reaction plus the amount lost by leakage and by solution in the liquid product. The amount of hydrogen used in the hydrogenation reaction will vary from case to case but is typically in the order of 100–200 cubic feet per barrel of oil.

An important feature of the process of the invention is the amount of hydrogen gas recycled. Thus, the amount of gas passing in line 13 just prior to adding the make-up hydrogen should not exceed 250 liters per kilogram of oil (about 1200 cubic feet per barrel of oil). The preferred range is between 50 liters per kilogram and about 150 liters per kilogram, e. g. 125 liters per kilogram. Excellent results have been obtained with amounts as low as 25 liters per kilogram in some cases.

The hydrodesulfurization reaction requires a temperature of at least 325° C. and requires that the temperature should not exceed about 425° C. The reaction is slightly exothermic and there is, therefore, a small temperature rise in the reaction zone. The maximum temperature in the catalyst bed is controlled within the stated range by controlling the inlet temperature of the preheated feed oil and recycled gas. Other conventional means of controlling the temperature may also be employed if desired.

The pressure in the process of the invention is above 450 lbs. per square inch, and preferably above 500 p. s. i. Pressures in the order of 600–1,000 p. s. i. are most practicable.

The high pressure and the very low recycled gas rates employed allow only a small vaporization of the oil. It is considered that avoidance of substantial vaporization is important. Thus, in the process of the invention the oil in the reaction zone is at least 50% in the liquid phase and is preferably maintained above 75% e. g. 80–90% in the liquid phase. The conditions of temperature, pressure and recycled gas rate are preferably adjusted within the indicated limits to allow less than 50% of vaporization of the oil.

The liquid product withdrawn from the high-pressure separator 16 is passed through a relief valve 23 into a low-pressure separator 24 wherein small amounts of dissolved hydrogen sulfide and hydrogen are released. This gas is withdrawn via line 25. The liquid product is withdrawn via line 26. This liquid product may be treated in any of the conventional ways to remove remaining traces of dissolved hydrogen sulfide, e. g. by the Girbotol process or by stabilization.

When effecting hydrodesulfurization in the manner described, it is not only possible to obtain an efficient desulfurization, but it is possible to effect the desulfurization while operating continuously over hundreds of hours with no regeneration of the catalyst or serious decline in the desulfurization efficiency.

In the following examples oils having the following inspection data were used.

| Feed No. | 1 | 2 | 3 | 4 | 5 | 6 | 7 | 8 |
|---|---|---|---|---|---|---|---|---|
| $d_4^{20}$ | 0.8457 | 0.8466 | 0.8471 | 0.8428 | 0.8470 | 0.845 | 0.901 | [1] 0.899 |
| Aniline Point, °C | 73 | 72.2 | 72.6 | 72.6 | 72.6 | 72.5 | 80.5 | 80.0 |
| Sulfur percent weight | 1.26 | 1.20 | 1.30 | 1.10 | 1.25 | 1.25 | 2.45 | 2.68 |
| Conradson Carbon | | | | | | | 0.24 | 0.46 |
| A.S.T.M. Distillation, °C: | | | | | | | | |
| I.B.P. | 245 | 260 | 266 | 260 | 259 | 250 | 281 | 296 |
| 10% | 269 | 270 | 282 | 276 | 274 | 272 | 329 | 376 |
| 20% | 275 | 275 | 287 | 281 | 278 | | | |
| 30% | 281 | 279 | 292 | 285 | 283 | 281 | 363 | 408 |
| 40% | 288 | 284 | 296 | 288 | 289 | | | |
| 50% | 298 | 290 | 300 | 292 | 295 | 293 | 405 | 438 |
| 60% | 304 | 296 | 307 | 297 | 303 | | | |
| 70% | 315 | 305 | 312 | 302 | 312 | 310 | 453 | 474 |
| 80% | 326 | 314 | 320 | 308 | 322 | | | |
| 90% | 341 | 327 | 333 | 318 | 337 | 335 | 499 | 509 |
| 95% | 352 | 338 | 340 | 325 | 345 | 345 | 512 | |
| F.B.P. | 358 | 347 | 346 | 333 | 354 | 352 | | |
| Res., Volume percent | 1 | 2 | 1.5 | 0.5 | 1.5 | 1.5 | 3.0 | 8.0 |

[1] 50/4° C.

Gas oils having essentially the properties of feeds Nos. 1 and 2 were desulfurized using a molybdena-alumina catalyst promoted with cobalt oxide. The catalyst was prepared as follows.

A commercial activated alumina (Alorco F-1) in 3-5 mm. granules was calcined for two hours at 500° C. and then treated for 16 hours at 100° C. with a 15% solution of hydrochloric acid. After washing and drying the alumina was again calcined at 500° C. for three hours. The alumina was then impregnated with a solution containing ammonium molybdate and cobalt nitrate to give a composite containing 6.5 parts of molybdenum and 0.8 part of cobalt to each 100 parts of alumina. The composite was then dried, ground to pass a 45 mesh sieve and finally pelleted with 1% graphite into cylindrical pellets 3 mm. x 5 mm. The pellets were finally heated to 370° C. under nitrogen for two hours.

The desulfurization was carried out under the following conditions:

| | |
|---|---|
| Temperature, °C | 375 |
| Pressure, atm | 50 |
| L.H.S.V. | 2.4-3.6 |
| Recycle gas rate, l./kg | 250 |
| Reactor, l./d | 30 |

For the first 130 hours of operation the L.H.S.V. was 2.4 during which time the oil was 88% desulfurized. The L.H.S.V. was then increased to 3.6 and the process continued without regeneration to 300 hours. The desulfurization remained constant at 80%. The original space velocity was again established and the process was continued. After 407 hours of continuous processing the recycle gas rate was dropped to 125 l./kg. During this period of from 403 to 630 hours the oil was 89% desulfurized. The recycle gas rate was further reduced to 60 l./kg. This resulted in a slight loss in efficiency (83% desulfurization), but did not result in deactivation of the catalyst since upon returning to the original condition the desulfurization after a total 920 hours was still 86%.

Following the above experiments the same catalyst was used to treat the same feed oil using a pressure of 20 atmospheres and a recycle gas rate of 100 l./kg. Under these conditions (960-1065 processing hours) the oil was only 74% desulfurized. Moreover the activity of the catalyst declined, since upon returning to 50 atmospheres pressure and 60 l./kg. of recycle gas only 70% desulfurization was obtained instead of 83%.

A gas oil having the inspection data of feed No. 3 was desulfurized in the described manner using a commercial tungsten sulfide-nickel sulfide catalyst (I. G. Farben Industrie No. 5615) (mol ratio of W to Ni—2:1). (5 x 5 mm. pellets).

The process was carried out under the following conditions:

| | |
|---|---|
| Temperature, °C | 350 |
| Pressure, atm | 50 |
| L.H.S.V. | 2.4 |
| Recycle gas rate, l./kg | 125 |
| Reactor, l./d | 70 |
| Gal. oil/ft.²/min | About 1.8 |

Over 230 hours of processing the desulfurization was constant at 90%. The L.H.S.V. was then increased to 3.6; the desulfurization decreased to 76% but after a period of use it returned to 90% when the original conditions were reestablished, showing that the catalyst did not suffer any appreciable decline in activity. Under the conditions of treatment the oil was approximately 85-90% in the liquid state.

Gas oils having the inspection data of feeds Nos. 4, 5 and 6 were desulfurized with a cobalt promoted molybdena-alumina catalyst prepared as described above.

The desulfurization was carried out under the following conditions:

| | |
|---|---|
| Temperature, °C | 375 |
| Pressure, atm | 50 |
| L.H.S.V. | 2.4 |
| Recycle gas rate, l./kg | 50 |
| Reactor, l./d | 70 |
| Gal. oil/ft.²/min | About 1.8 |

During the first 235 hours of operation the average desulfurization amounted to 77% after which it leveled off to a constant value of 80%. After 574 hours of operation the recycle gas rate was increased to 125 l./kg. This resulted in a slight increase in the desulfurization efficiency to 82%. After 1170 hours of operation the gas recycle rate was set at 60 l./kg. and the process was continued with 83% desulfurization. The catalyst was found to have a carbon content of 1.3% wt.

The above catalyst, after 1259 hours of use, was used, without regeneration, for the desulfurization of a flashed distillate having the inspection data of the above feed No. 7 under the following conditions:

| | |
|---|---|
| Temperature, °C | 375 |
| Pressure, atm | 50 |
| L.H.S.V. | 1.1 |
| Recycle gas rate, l./kg | 250 |

At 1260 and 1534 processing hours the desulfurization was 79 and 80% with no sign of catalyst deactivation. The Conradson carbon was reduced to 0.01%.

The same catalyst mentioned immediately above, after 2800 hours of use without any regeneration was used to desulfurize a waxy distillate having the inspection data of the above-mentioned feed No. 8 at a gas recycle rate of 50 l./kg. and 25 l./kg. (other conditions unchanged). At these very low rates and with this high sulfur refractory feed the desulfurization was 56% and 53%, respectively. Better desulfurization can be obtained with the feed when somewhat higher gas recycle rates are employed.

In all of the above examples no appreciable cracking took place and the yield of liquid product was in the order of 99%.

Not only is it possible to obtain an efficient substantially continuous desulfurization of various sulfur-bearing hydrocarbon oils, including heavy, waxy and refractory oils, by operating in the manner indicated, but it is possible to obtain this desired result in a much more economical manner. As pointed out above, by the most efficient and economical hydrodesulfurization process hitherto available the processing costs were in the order of 30 cents per barrel, even when using by-product hydrogen at fuel gas value, and consequently the hydrodesulfurization of hydrocarbon oils could not be used economically except in a few isolated instances for the treatment of specialty products commanding a high price. The improved economy of the present process allows the hydrodesulfurization to be used economically for a much wider range of materials. The nature and extent of the improved economy may be seen from the following tabulation of the comparative cost of hydrodesulfurizing a typical gas oil by the conventional method and by a typical application of the present method. This comparison is for a typical size plant of 10,000 barrels per day capacity operating under approximately the optimum conditions for 80% desulfurization of a typical gas oil containing 1.2% sulfur. These processing conditions are as follows:

|  | Vapor phase process | Present process |
|---|---|---|
| Temperature, °C | 375 | 375 |
| Pressure, atm | 50 | 50 |
| L. H. S. V | 3 | 1.75 |
| Recycle gas rate, ft.$^3$/bbl | 7,000 | 1,200 |
| Catalyst | (¹) | (¹) |
| Catalytic life | 6 mo. | 6 mo. |
| Catalyst cost | 47¢/lb. | 47¢/lb. |
| Capital Costs (in Thousands of Dollars): | | |
| Columns | 42 | 33 |
| Reactor | 50 | 49 |
| Heat exchangers | 183 | 131 |
| Separators, etc | 33 | 29 |
| Pumps and Compressors | 144 | 61 |
| Furnaces | 115 | 85 |
| Instrumentation, etc | 108 | 82 |
| Total equipment costs | 675 | 470 |
| Total plant cost, installed | 2,400 | 2,000 |
| Operating Costs (in cents per barrel): | | |
| Catalyst | 1.2 | 2.1 |
| Hydrogen (9¢/mm. B. t. u.) | 0.5 | 0.5 |
| Chemicals | 0.3 | 0.3 |
| Steam | 0.77 | 0.43 |
| Electric Power | 0.10 | 0.07 |
| Fuel Gas | 2.15 | 1.50 |
| Cooling Water | 1.09 | 0.75 |
| Labor, Maintenance, Interest and Amortization | 24.3 | 20.7 |
| Total Manufacturing Costs | 30.5 | 26.4 |

¹ Molybdena-alumina-cobalt.

I claim as my invention:

1. The process for the desulfurization of sulfur-bearing hydrocarbon oils which comprises passing the hydrocarbon oil to be desulfurized substantially continuously in the liquid phase downwardly through a bed of stationary granules of a sulfactive hydrogenation catalyst having a ratio of height to effective diameter of at least 5:1 at a rate between 1 and 20 gallons of oil per minute per square foot of cross section of the catalyst, also passing downwardly through said bed of catalyst simultaneously with said oil a recycled stream of gas rich in hydrogen in an amount such that the gas withdrawn from said catalyst bed is between 50 and 250 liters per kilogram of said oil, the temperature in said bed of catalyst being maintained between 250° C. and 425° C. and the pressure being maintained above 30 atmospheres, whereby the oil is desulfurized with substantially no destructive hydrogenation and continuing this process for a period in excess of 200 hours without regeneration of the catalyst.

2. The process according to claim 1 further characterized in that the ratio of height to the effective diameter of the cataylst bed is at least 6:1.

3. The process according to claim 1 further characterized in that the oil to be desulfurized is passed at a rate of at least 3 gal./min./ft.² of catalyst bed and at a liquid hourly space velocity above 1.

4. The process according to claim 1 further characterized in that the amount of recycle gas withdrawn from the catalyst bed is about 125 l./kg. of oil.

5. The process according to claim 1 further characterized in that the conditions of pressure, temperature and amount of recycled gas are adjusted within the given limits to prevent more than 20% of the oil from vaporizing in the reaction zone.

6. The process according to claim 1 further characterized in that during the passage of the oil through the catalyst bed oil from the peripheral portions of the catalyst bed is repeatedly directed towards the center.

HAN HOOG.

REFERENCES CITED

The following references are of record in the file of this patent:

UNITED STATES PATENTS

| Number | Name | Date |
|---|---|---|
| 1,944,236 | Haslam | Jan. 23, 1934 |
| 2,029,100 | Grosse | Jan. 28, 1936 |
| 2,392,579 | Cole | Jan. 8, 1946 |
| 2,393,288 | Byrns | Jan. 22, 1946 |
| 2,417,308 | Lee | Mar. 11, 1947 |
| 2,431,920 | Cole | Dec. 2, 1947 |
| 2,437,532 | Huffman | Mar. 9, 1948 |
| 2,441,297 | Stirton | May 11, 1948 |

OTHER REFERENCES

Elgin et al., Ind. and Eng. Chem., 22, pp. 1284–93 (1930).